United States Patent
Döring (10) Patent No.: US 8,423,720 B2
(45) Date of Patent: Apr. 16, 2013

(54) COMPUTER SYSTEM, METHOD, CACHE CONTROLLER AND COMPUTER PROGRAM FOR CACHING I/O REQUESTS

(75) Inventor: Andreas Christian Döring, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 1016 days.

(21) Appl. No.: 12/114,846

(22) Filed: May 5, 2008

(65) Prior Publication Data

US 2008/0282040 A1    Nov. 13, 2008

(30) Foreign Application Priority Data

May 10, 2007 (EP) .................................. 07107935

(51) Int. Cl.
*G06F 12/08* (2006.01)
(52) U.S. Cl.
USPC ............ 711/137; 711/E12.017; 711/E12.057; 710/305; 712/207
(58) Field of Classification Search .................. 710/305; 711/100, E12.057, 118, 137, 154, E12.017; 712/207
See application file for complete search history.

(56) References Cited

U.S. PATENT DOCUMENTS

| | | | |
|---|---|---|---|
| 5,497,480 A * | 3/1996 | Hayes et al. ................. | 711/166 |
| 6,269,425 B1 * | 7/2001 | Mounes-Toussi et al. .... | 711/133 |
| 6,381,674 B2 * | 4/2002 | DeKoning et al. ............ | 711/113 |
| 6,954,807 B2 | 10/2005 | Shih | |
| 6,965,982 B2 * | 11/2005 | Nemawarkar ................ | 712/207 |
| 7,010,626 B2 | 3/2006 | Kahle | |
| 7,076,575 B2 | 7/2006 | Baitinger et al. | |
| 7,177,900 B2 * | 2/2007 | Ims et al. ...................... | 709/201 |
| 7,594,055 B2 * | 9/2009 | Gower et al. ................ | 710/305 |
| 7,793,040 B2 * | 9/2010 | Bittner, Jr. .................... | 711/108 |
| 2003/0004683 A1 * | 1/2003 | Nemawarkar ................ | 702/186 |
| 2006/0143333 A1 | 6/2006 | Minturn et al. | |
| 2006/0173995 A1 * | 8/2006 | Moriwaki ..................... | 709/224 |

* cited by examiner

*Primary Examiner* — Pierre-Michel Bataille (74) *Attorney, Agent, or Firm* — Tutunjian & Bitetto, P.C.; Gail Zarick (57) ABSTRACT

A computer system having a main unit and an expansion unit connected by an interface arrangement. The expansion unit includes at least one connector for receiving an input/output component, so that additional input/output components can be added to the computer system. The interface arrangement includes at least one cache controller and at least one cache memory for monitoring and predicting requests exchanged between the main unit and the expansion unit. A method of caching and processing input/output requests and a storage medium is also provided.

14 Claims, 6 Drawing Sheets

COMPUTER SYSTEM, METHOD, CACHE CONTROLLER AND COMPUTER PROGRAM FOR CACHING I/O REQUESTS

CROSS REFERENCE TO RELATED APPLICATION

This application claims priority under USC §119 from European Patent Application number 07/107935, filed on May. 10, 2007, the entire contents of which are incorporated herein by reference.

BACKGROUND OF THE INVENTION

1. Field of the Invention

The present invention generally relates to computer architectures. More particularly, the present invention relates to caching I/O requests in a computer system.

2. Description of the Related Art

Modern computer systems are often designed based on a modular architecture, allowing individual extension modules to be added to a computer system based on the specific requirements of the system. Extension modules vary widely and may include peripheral as well as internal extension devices or adapter cards, such as network interface cards, graphic boards or storage controllers, among others.

In particular, the last kind of extension modules, i.e. adapter cards, referred to as I/O components in the remainder of this application, are usually installed using high-speed connectors, such as the peripheral component interconnect express interface (PCIe), in close functional, electrical and spatial proximity to core system components such as the main processor, also referred to as CPU, and the main memory. Such an arrangement allows I/O components to operate at a very high speed and, at least in part, independently from the main processor.

However, due to the limitations in both space and electrical connectors available for I/O components in a casing of a computer system, some computer systems make use of an expansion unit in order to accommodate further I/O components. Such computer systems including a main unit and at least one expansion unit are particularly useful for larger server systems, including a multiplicity of I/O components.

One limitation of such computer systems is the latency added by the extended signaling path and driver electronic connecting the main unit and the expansion unit.

Some related art documents are concerned with accessing and caching requests to input/output components. Among those, patent U.S. Pat. No. 7,076,575 B2 to Baitinger et al. teaches a method for accessing input/output devices in embedded control environments. Further, patent application US 2006/0143333 A1 by Minturn et al. describes an apparatus and a method for enabling cacheable writes to registers of input/output device. Patent U.S. Pat. No. 7,010,626 B2 to Kahle discloses a method and apparatus for prefetching data from a system memory to a cache for direct memory access (DMA). Finally, patent U.S. Pat. No. 6,954,807 B2 to Shih discloses a method and a DMA controller for transferring data packets from a memory to a network interface card.

It is a challenge to describe improved computer systems and methods of operation for such systems providing particularly high performance communication between a main unit and an expansion unit. The present invention provides such a systems and methods of its operation providing, particularly, high performance communication between a main unit and an expansion unit.

SUMMARY OF THE INVENTION

In one aspect, the present invention provides a computer system having a main unit which has a main memory, at least one processor for processing data from the main memory, and an input/output interface. The computer system further includes an expansion unit including at least one connector for receiving an input/output component and an interface arrangement connecting the main unit and the expansion unit, the interface arrangement including at least one cache controller and at least one cache memory for storing data to be transmitted to or from the at least one input/output component of the expansion unit, wherein the at least one cache controller is operable to monitor request exchange over the interface arrangement and to prefetch data in the at least one cache memory for requests predicted based on the monitor request.

By adding a cache controller and a cache memory to an interface arrangement used to connect a main unit and an expansion unit, the cache controller is capable of monitoring request exchanged between the main unit and the expansion unit and, based on the monitored request, to predict future requests. By storing and buffering data to be transmitted to or from the at least one input/output component, subsequent, predicted requests may be responded to faster than in a system without such an interface arrangement.

The present invention and its embodiments will be more fully understood by reference to the Drawings and the Detailed Description of the Preferred Embodiments that follow.

DETAILED DESCRIPTION OF THE PREFERRED EMBODIMENTS

According to an improved embodiment of a first aspect, the at least one cache memory includes a tagged content addressable memory, and the addresses associated with at least one input/output component are used for tagging. By using a tagged content addressable memory, large quantities of data can be addressed based on an address associated with an input/output component, thus allowing fast retrieval of large amounts of buffer data.

According to another improved embodiment of the first aspect, the interface arrangement includes a first cache controller and a first cache memory, arranged in proximity to the input/output interface, and a second cache controller and a second cache memory, arranged in proximity to the expansion unit. By providing first and second cache controllers and memories, one of each arranged at the main units and the expansion units of the interface arrangement, the response times between the first cache controller and the components of the main unit on the one side and the second cache controller and the I/O component on the other side can be reduced.

According to a further improved embodiment of the first aspect, the first and second cache controllers include means for inter-cache controller communication. By providing means for inter-cache controller communication, one cache controller can control the operation of the other cache controller, thus forming a collaborative system further improving the performance of the interface arrangement.

According to a second aspect of the invention, a method of operating is provided in a computer system including a main unit, an expansion unit and an interface arrangement connecting the main unit and the expansion unit. The main unit includes a main memory, at least one processor and an input/output interface, the expansion unit includes at least one connector for receiving an input/output component and the interface arrangement includes at least one cache controller and at least one cache memory.

The method of operation includes the steps of:
providing a first request associated with an input/output component of the expansion unit by a requestor to a requestee;
receiving the first request by the cache controller;
predicting, based on the first request and the associated input/output component, a second request likely to succeed the first request; and
prefetching data associated with the second request and storing the data in the cache memory.

By predicting a second request based on a received first request through a cache controller, data associated with the second request can be prefetched and stored in the cache memory, thus accelerating future requests.

In the second aspect of the present invention, the method further includes receiving the second request by the cache controller, determining whether the second request can be served using data stored in the cache memory; if the second request can be served using data stored in the cache memory, providing a third request based on the data stored; and, otherwise, if the second request cannot be served using data stored in the cache memory, forwarding the second request. By intercepting the second request and determining whether the second request can be served using data stored in the cache memory, latency induced by communication over the interface arrangement can be reduced or avoided, if the second request can be responded to based on data stored in the cache memory. In case a third request in response to the second request cannot be generated based on cached data, forwarding the second request allows obtaining the response.

In an improved embodiment of the second aspect of the present invention, the at least one cache controller is operable in a learning mode and in a normal operation mode, and further includes the following steps performed in the learning mode:
forwarding the first request to the requestee;
receiving a second request from the requestee;
forwarding the second request to the requester; and
correlating the first request and the second request to derive a property of the associated input/output component.

By providing a learning mode for the cache controller, in which the cache controller observes first and second requests exchanged between a requester and a requestee, properties of an input/output component associated with the request and response can be learnt by the cache controller using analysis based on correlation or pattern matching.

According to a further improved embodiment of the second aspect, the method further includes receiving a third request associated with the input/output component of the expansion unit by the requestor to the requestee, wherein, in the step of correlating, the third request is taken into account to derive the property of the associated input/output component. By taking into account a third request exchanged between the requester and the requestee, more complex interaction scenarios can be learnt by the cache controller.

According to a still further improved embodiment of the second aspect, the first or the second request includes at least one of the following: an address associated with the input/output component, an interrupt associated with the input/output component, or a data value associated with a specific request type. By monitoring requests for the occurrence of known addresses, interrupts of data values, individual request types can be identified by the cache controller, allowing precise prediction of future requests.

According to an even further improved embodiment according to the second aspect, the method further includes clearing the data from the at least one cache memory by the at least one cache controller, in at least one of the following cases: a timer associated with the data expires, the data is used in a third request sent to the requester, or a further request associated with the input/output component is received by the cache controller, the further request invalidating the data. By clearing data from the cache memory after a predetermined amount of time, after the data was successfully used, or after it has been invalidated by a subsequent operation, cache coherency can be maintained. At the same time, clearing the data frees space in the cache memory in order to store further data for further predicted requests.

According to a third aspect of the present invention, a cache controller for use in an interface arrangement having a main unit and an expansion unit is provided. The main unit includes a main memory, at least one processor and an input/output interface and the expansion unit includes at least one connector for receiving an input/output component. The cache controller is functionally coupled to a cache memory and operable to monitor requests exchanged over the interface arrangement and to prefetch data in the at least one cache memory for requests predicted based on the monitored requests.

A cache controller in accordance with the third aspect of the invention allows to successfully cache data for I/O requests in a computer system according to the first aspect.

According to a fourth aspect of the present invention, a computer program product comprising a computer readable medium embodying program instructions executable by a processing device of the cache controller is provided. The program instructions include the steps of:
receiving a first request from a requester to a requestee associated with an input/output component,
predicting, based on the first request and the associated input/output component, a second request likely to succeed the first request, and
prefetching data associated with the second request, and storing the data in the cache memory.

A computer program product, having program instructions executing the steps detailed above, allows a method in accordance with the second aspect to be performed by a processing device of a cache controller.

Figure 1:
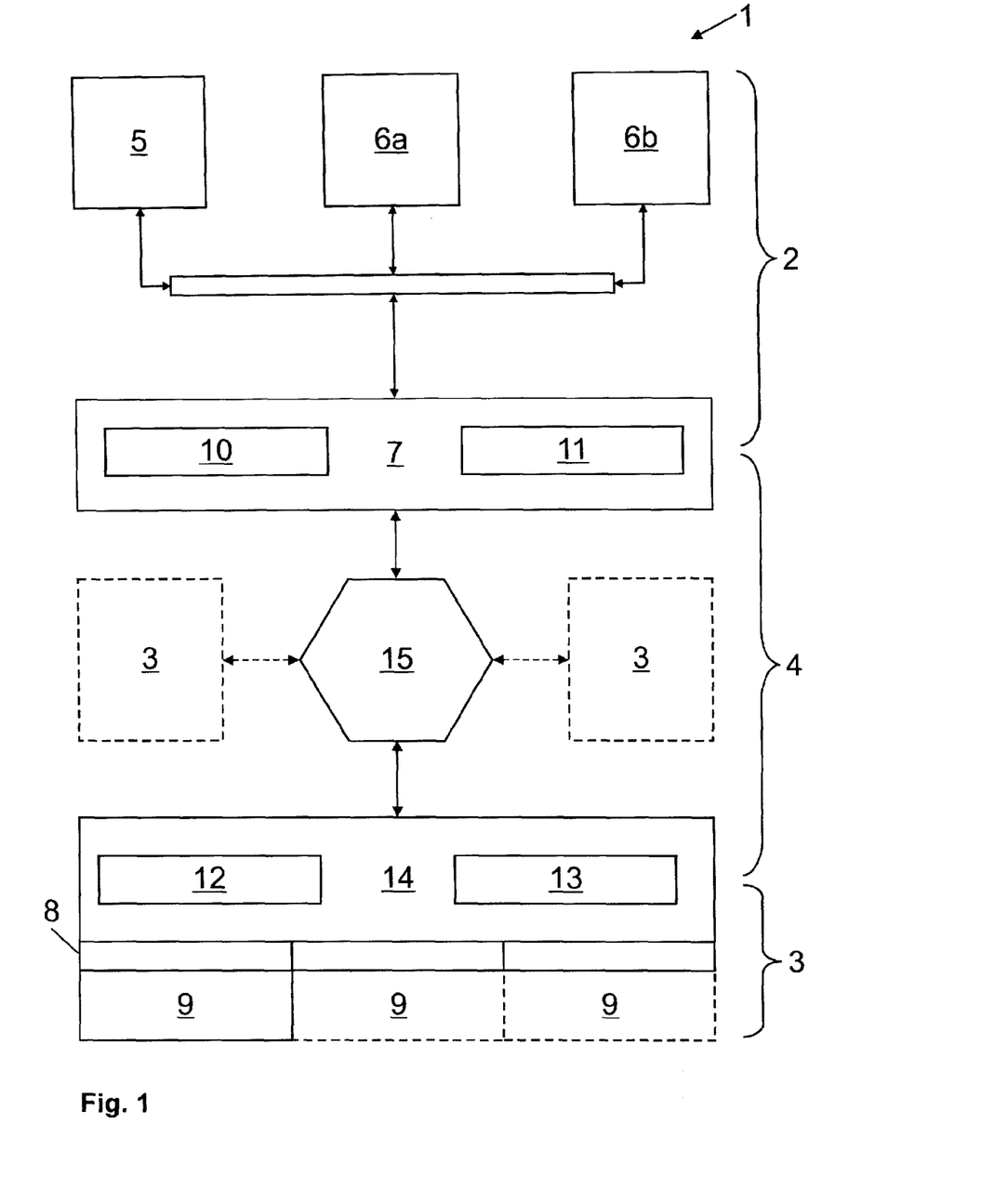
FIG. 1 shows a schematic diagram of a computer system architecture according to an embodiment of the invention.

FIG. 1 shows a computer system 1 including a main unit 2, an expansion unit 3 and an interface arrangement 4 connecting the main unit 2 with the expansion unit 3.

The main unit 2 includes core components of the computer system 1. In the example presented in FIG. 1, the main unit 2 includes a main memory 5 and two processors 6a and 6b. In addition, the main unit 2 includes an input/output interface 7.

The main memory 5, the processors 6a and 6b and the input/output interface 7 are interconnected by one or several busses, switches, hubs or other means of coupling system components.

The expansion unit 3 includes an interface unit 14 with several connectors 8, which allow installing input/output components 9 into the expansion unit 3. In the example shown in FIG. 1, three connectors 8 for receiving three input/output components 9 are shown. However, any number of connectors 8 and input/output components 9 may be possible. In practice, the number of input/output components 9 may be determined by the physical arrangement of the expansion unit 3 or by the number or connectors 8 allowed on a bus system used to interconnect them.

The expansion unit 3 offers slots for adding input/output components 9 in a separate mechanical enclosure. In consequence, the latency for an access to the main memory 5 from the input/output components 9, an interrupt from the input/output components 9 to the processor 6 or an access of the processor 6 to a register on the input/output components 9 is much larger than in a traditional computer system, such as a personal computer or small server, where the distance between the input/output components 9 on one end and the processor 6 on the other end typically is less than 30 cm and only one or two chips are passed on that path.

In order to improve the reliability and security of the computer system 1 shown in FIG. 1, additional checks are done for the communication between input/output components 9 and main memory 5 or processor 6. All in all, the latency for an access of one of the processors 6 to the input/output components 9 may amount to as much as 2 microseconds as opposed to about 50 ns in a traditional computer system.

However, most input/output components 9 offered on the market are optimized for the large part of the market, i.e. for use in personal computers and small servers. In consequence, the use of these input/output components 9 in a large computer system 1 as disclosed in FIG. 1 suffers significant performance degradation.

Therefore, according to the embodiment shown in FIG. 1, the use of a pair of cache arrangements at both ends of the expansion network 15 is proposed. There, the interface arrangement 4 includes a first cache controller 10 inside the input/output interface 7 of the main unit 2 and an associated first cache memory 11. On the side of the expansion unit 3, the interface arrangement 4 includes a second cache controller 12 with an associated second cache memory 13. The second cache controller 12 and the second cache memory 13 are included in the interface unit 14.

The interface unit 14 is connected to the input/output interface 7 by means of an expansion network 15. The expansion network 15 may include one or several switches, hubs, network links and associated driver electronic in order to connect one or several expansion units 3 with one main unit 2. In the example shown in FIG. 1, two further optional expansion units 3 connected to the expansion network 15 are shown. In this way, a large number of input/output components 9 may be connected with a main unit 2.

The cache arrangement may also be integrated into components, like switches, of the expansion network 15, rather than into the main unit 2 and expansion unit 3, as shown in FIG. 1. In addition, the first cache controller 10 or cache memory 11 may be integrated with a processor cache within the processor 6 or a main memory controller chip, which allows the double use of the already existing processor cache.

Although not shown in FIG. 1, the main unit 2 or expansion unit 3 may include further components, like other internal components, peripheral devices and the like. For example, further input/output components 9 may be installed in the main unit 2.

Input/output components 9 often use buffers in order to improve performance. This means that for output operations the input/output components 9 reads a certain amount of data from the main memory 5 and outputs it over time, dependent on the characteristic of an input/output device connected to it. For instance, an SCSI adapter might be connected to a high end hard disk drive (HDD), which itself has some buffer. For writing to the HDD the data can immediately be transferred from the SCSI adapter to the disk. However, if the SCSI adapter is connected to a slower tape drive with less buffer space, the data is transferred slower and in smaller units at a time.

It should be noted though that, while various methods described below in the context of different embodiments make use of device specific buffer memories in order to improve performance, methods and systems disclosed herein are also applicable for input/output components 9 having no internal buffer memory. Due to their lack of buffer memory, access time is of particular importance for these components, as they may run out of valid data without further warning.

Similar characteristics are valid for input/output components 9 for networking or graphics. The FireWire (IEEE 1394) bus for instance has backpressure flow control. It stops the transmission of further data when the receiving side cannot accept it. If a Compact Disk (CD) or Digital Versatile Disk (DVD) burner is connected to a FireWire input/output component 9, the transfer speed is slow and depends on the write speed.

For input the situation is similar, in that first data is collected a buffer of the input/output component 9 until a sufficient amount for a larger transfer to main memory 5 has been accumulated.

The buffering is typically organized on two levels. The first level is the pure data buffering between the main memory 5 and the input/output component 9. The second level is the buffering between the processing by the processor 6 and the data transfer by the input/output component 9. Since interrupts to the processor 6 are costly, this second level has an even larger time horizon than the first level. Therefore, a larger amount of data for transmission or empty buffer space for receiving is provided by the processor 6, for instance in form of a ring-buffer or a linked list of buffer blocks in the main memory 5. If the input/output component 9 has used this list up, for example by filling the empty buffers with received data or by transmitting all data from buffers, it interrupts the processor 6, for example to initiate the processing of the data or provisioning of new data.

The structure of these buffer lists is device specific, for instance, an Ethernet (IEEE 802.3) interface, which is used with the transmission control protocol (TCP) of the internet protocol (IP) maintains the boundaries between individual Ethernet frames, and it provides typically also the TCP checksum of received data packets. Therefore, the buffer has a certain structure, which would not be applicable for a different input/output component 9, like a SCSI adapter.

Both levels of buffering are designed for a low-latency between input/output component 9 and a processor 6 and the main memory 5. When using these input/output component 9 with a long latency, for example in a large computer system 1, the data for refill of the first level data buffer or the provisioning of more buffer list entries by the processor 6 will not be in time resulting in unused cycles of the input/output component 9.

Figure 2:
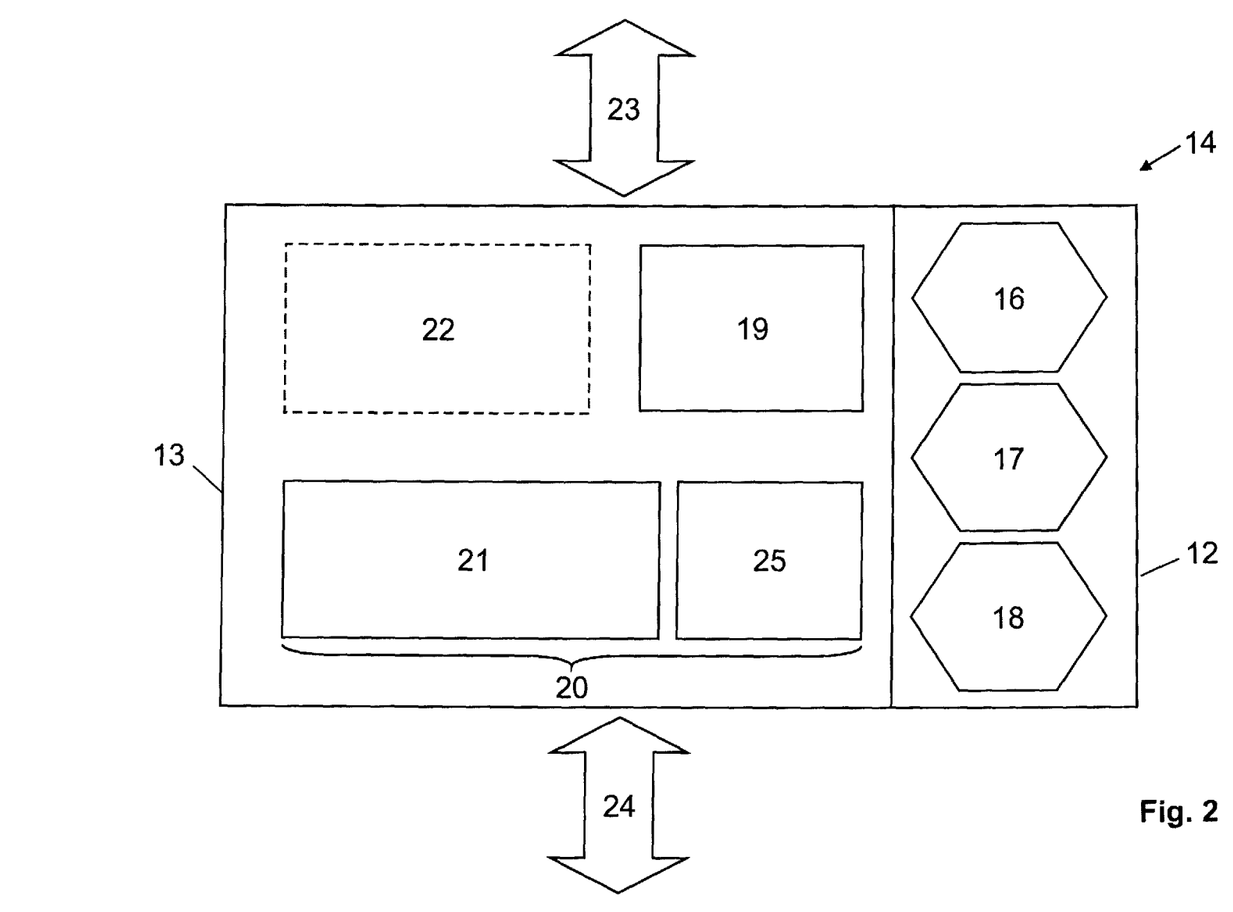
FIG. 2 shows a more detailed block diagram of an arrangement including a cache controller and a cache memory.

FIG. 2 shows a more detailed block diagram of the interface unit 14. Although FIG. 2 shows the setup of the interface unit 14, the input/output interface 7 may have a similar setup, e.g. the first and second cache controllers may be symmetrical in setup and operation.

The interface unit 14 includes the cache controller 12 and the cache memory 13. The cache controller 12 includes a cache clearing engine 16, a prefetch trigger engine 17 and a fetch engine 18. The cache clearing engine 16 is responsible for removing invalid, outdated or unnecessary entries from the cache memory 13. The prefetch trigger engine 17 is responsible for monitoring request and predicting data items for future I/O requests and the fetch engine 18 is responsible for actually fetching such data items from one or several input/output components 9.

A request be may include any signal sent from any component of the main unit 2 to an input/output component 9 or vice versa, including, but not limited to, read or write accesses from the processor 6 to a register of the input/output component 9, read or write accesses from an input/output component 9 to a register of any component of the main unit 2, interrupt requests raised by any components of the computer system 1, or read or write accesses to the main memory 2. Any other method of signaling input/output events may be substituted for the specific signaling means of the exemplary embodiments described below.

The actual operations and interactions of the cache clearing engine 16, the prefetch trigger engine 17 and the fetch engine 18 will be described in more detail using the interaction diagrams described below.

The cache memory 13 includes a trigger memory 19 and a tagged, content address memory (Tag CAM) 20 including a tag memory 25 and a data array 21. In addition, the cache memory 13 may include an optional history array 22. The trigger memory 19 stores rules about and properties of input/output components 9 attached to the interface unit 14. The information stored in the trigger memory 19 is used by the prefetch trigger engine 17 in order to predict the behavior o the respective input/output component 9. The Tag memory 25 stores tags associating data items of the data array 21 with addresses associated with input/output components 9 connected to the interface unit 14. The history array 22 may store additional information about past requests and responses from the main unit 2 or one or several input/output components 9 already seen by the interface unit 14.

The arrangement shown in FIG. 2 behaves similar to conventional cache systems, in that, for example the address of a read request is compared with each tag stored in the tag memory 25 and, if a match is found, the corresponding data from the data array 21 is provided. In contrast to typical processor caches, the data items corresponding to each tag can vary in size, i.e. there is no fixed cache line size, but some tags have only small data items, like a status register of only a byte or word in size, while others can have very long items, like PCIe supported data read requests of up to 4 Kbytes.

Dependent on the number and bandwidth of the associated input/output components 9 and the latency to the main memory 5, it can be necessary to use external memory devices to implement the data array of the second cache memory 13.

The history array 22 can be used to record past actions to an IO-device. In particular, if read requests were served from the cache memory 13 instead of the input/output component 9, the point in time at which a problem occurred in the input/output component 9 might be hidden. In such a case, the device driver refers to the history of cache operations to find out which operations truly were carried out with the input/output component 9 to allow recovery, replay, canceling, and reporting of the error functions.

The prefetch trigger engine 18 together with the trigger memory 19 snoop the requests which are not served by the cache controller 10 or 12 and which are not addressed to the cache controller 10 or 12 itself for situations which use a prefetch operation. The trigger engine 18 can be also started by the cache search mechanism.

This search is carried out on a device basis. For the first cache controller 10 this utilizes a large-scale address decoding, because a large number of input/output components 9 are supported. However, in a typical computer system 1 with a high number of input/output components 9 the number of different device types is not as large. For instance, a file server might employ many SCSI-adapters but it will be typically equipped with a set of adapters of the same type. This simplifies the search, as the decoding of the register address, interrupt type, etc. of the input/output components 9 can be done in parallel to finding the individual instance. Once the input/output component 9 in question is found, a stack-based matching algorithm may be used for each instance. In this way, previous requests can be recorded on the stack and the matching process itself can be implemented very efficiently.

The trigger engine's result can be a cache clear operation or a request for a fetch. The fetches are carried out by the fetch engine 18, which maintains outstanding reads, and processes the returned data accordingly, either by storing it into the cache memory 11 or 13 or by creating a request for the corresponding remote cache controller 10 or 12. A cache clear operation will clear an entry in the tag memory 25 and free the associated data array entry 21.

Cache entries may be also cleared by the cache cleaning engine 16. This engine operates on a cache hit or miss, on a remote store, on a trigger operation or based on a timer as detailed later. For instance, many cache entries should be cleared once they are read from the data array 21. Only if the transfer of the read data should be repeated (because of a data loss) the same data is transferred again. However consecutive reads to a larger item in the data array 21 with the same cache tag are typical and the tag CAM 20 is only cleared if the same position in the cache is read or when the end of the data item is reached. This can be done, for example, using the history array 22.

A second read to the same data item in the input/output domain always means the request for the most current entry. If such a pattern, i.e. repeated reads to the same register or memory location, is typical for an input/output component 9, the trigger engine 17 can be used to provide always a new copy after the previous one has been read out.

As shown in FIG. 2, the interface unit 14 includes two interfaces, a first interface 23 for connecting to one or several input/output components 9 via connectors 8 and a second interface 24 for connecting to the expansion network 15. In this particular case, the second cache controller 12 may have several first interfaces 23 to input/output components 9, potentially depending on the kind of connectors 8 provided. For example, PCI Express is based on a point to point link. Therefore, to allow the connection of several input/output components 9, they will typically share one second cache memory 13. In this case, the first interface 23 includes several individual interfaces. In case the interface unit 14 is used as input/output interface 7 of the main unit 2, the first interface 23 is connected to a bus system connecting to other components of the main unit 2, for example the main memory 5 and one or more processors 6.

Figure 3:
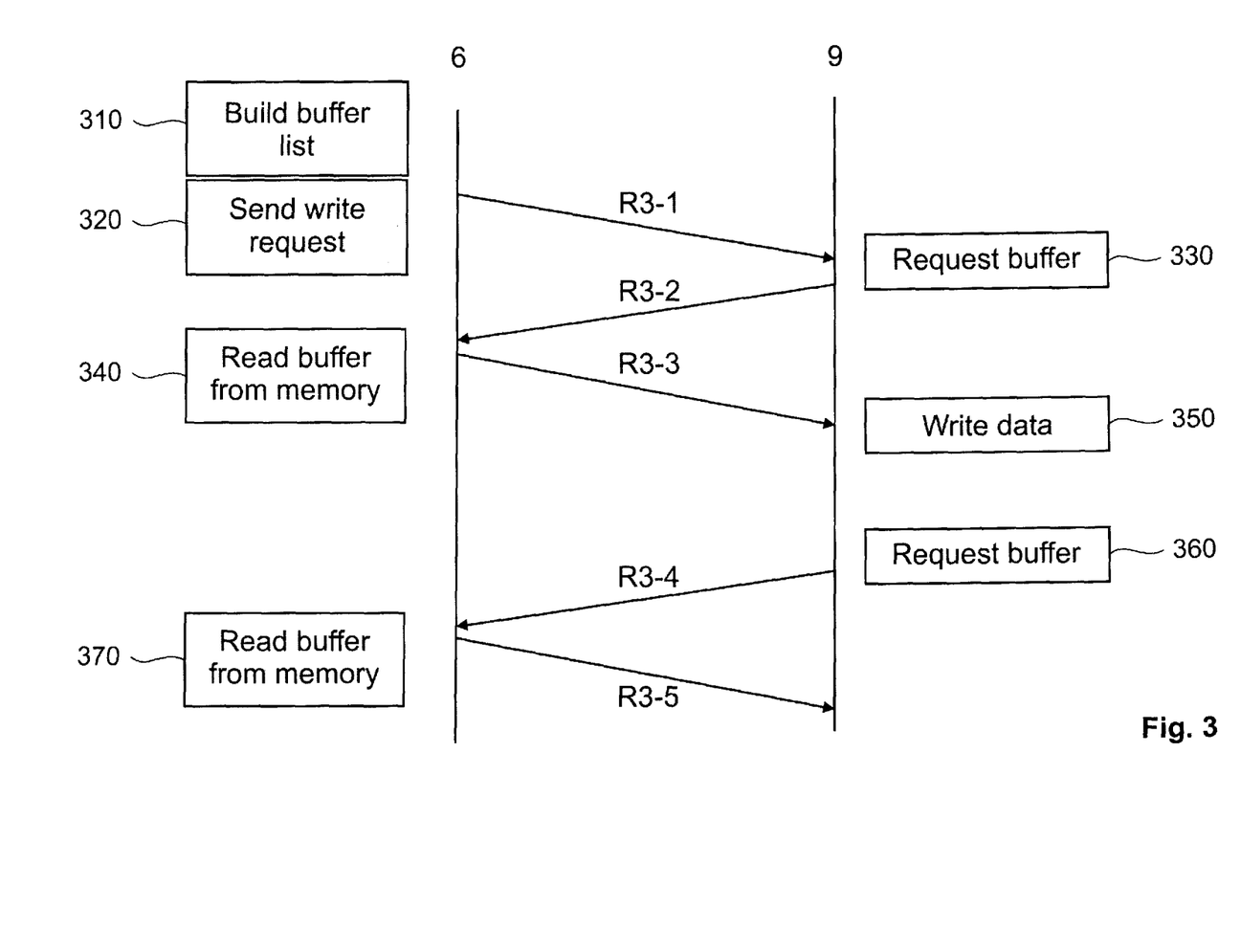
FIG. 3 shows an interaction diagram for a conventional first request.

FIG. 3 shows a first typical interaction pattern between a processor 6, or another component like a DMA-controller of the main unit 2, and an input/output component 8. In the interaction diagram shown in FIG. 3, the input/output adapter 9 may be an SCSI controller connected to a high-performance hard disk drive including an internal data cache. In the scenario depicted, the processor 6 writes a large amount of data stored in a buffer list to the hard disk drive.

In a step 310, the processor builds a buffer list including the data to be written. The buffer list may include any data structure including or referring to the data to be written and may be distributed over large amounts of the main memory 5. In a step 320, the processor 6 transmits a request R3-1 to the input output component 9. In the presented scenario, a pointer, i.e. an address reference, to the buffer list built in step 310 is transferred to the input/output component 9 together with the instruction to write the data of the buffer list to the hard disk drive.

In a step 330, the input/output component 9 checks whether its buffer memory contains data to be written. In the scenario, the request R3-1 starts the data transmission from the processor 6, so the buffer of the input/output component 9 is still empty. Consequently, it requests one or more buffers from the buffer list built in step 310 from the processor 6 in a request R3-2.

In a step 340, the processor 6 reads data from the main memory 5 including data from the buffer list. This data is transferred using a further request R3-3 to the input/output component 9.

Once the data starts arriving at the input/output component 9, in a step 350, the input/output component 9 starts transmitting the data, i.e. it starts writing data from its own buffer memory to the hard disk drive attached to it. Once the buffer of the SCSI controller or the hard disk drive is empty, in a step 360, the input/output component 9 issues an request R3-4, requesting further data buffers for writing from the processor 6.

Once this request is received by the processor 6, in step 370, it reads further data from the main memory 5 and transmits it back to the input/output component 9 with using a further request R3-5. This process, in particular the steps 330 to 350, is repeated as outlined above, until all data from the buffer list has been written to the hard disk drive.

As can be seen from the interaction diagram presented in FIG. 3, multiple requests are sent from the processor 6 to the input/output component 9 and back, before actual transmission of data to the hard disk drive connected to the input/output component 9 starts. Because the individual requests are exchanged over the expansion network 15, they take a comparatively long time to be received by the other side, thus resulting in high latency for the write operation.

Figure 4:
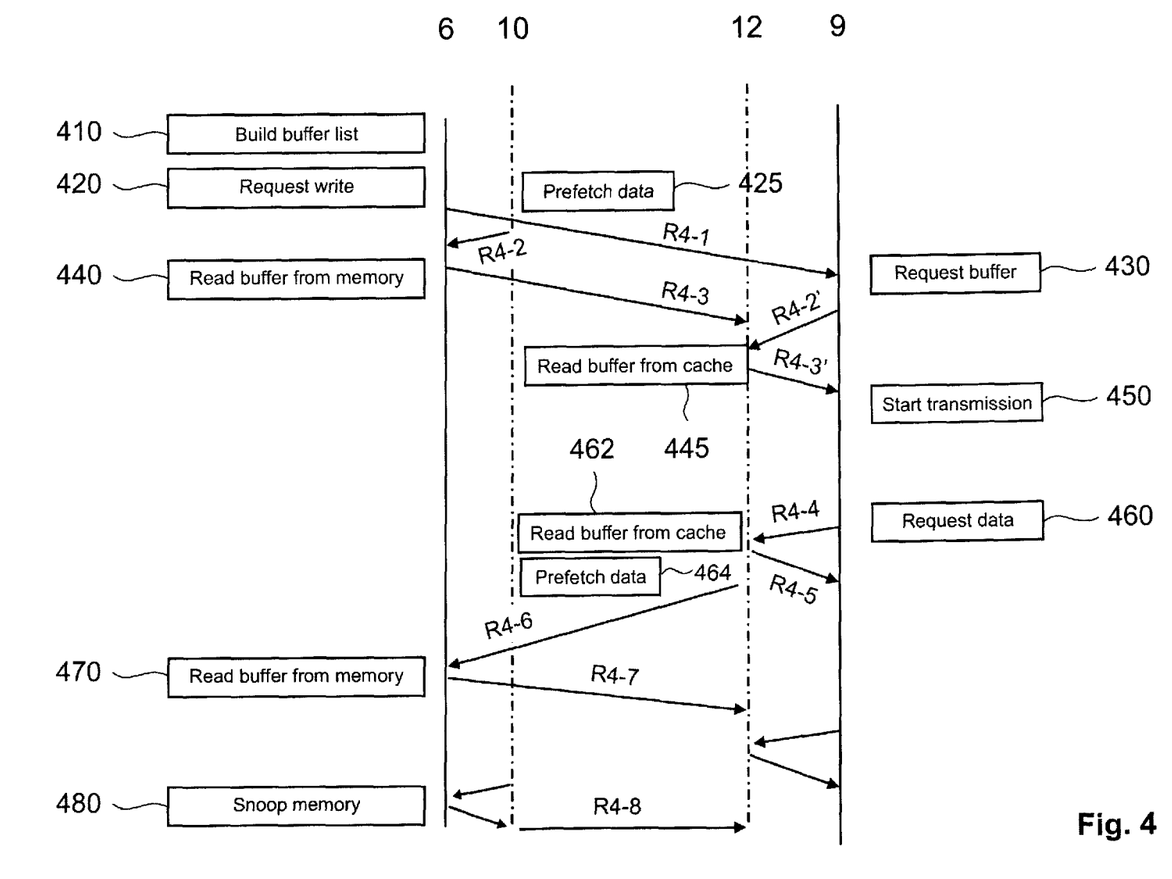
FIG. 4 shows an interaction diagram for the first request according to an embodiment of the present invention.

FIG. 4 shows an improved interaction diagram for the same interaction pattern in accordance with an embodiment of the invention. In the embodiment used during this example, two cache controllers 10 and 12, one at each end of the expansion network 15, are present.

In a step 410, the processor 6 builds a buffer list as described above with reference to step 310. In a further step 420, a pointer to the buffer list is transferred in a request R4-1 to the input/output component 9. The request R4-1 is similar to the request R3-1. However, due to the change in the system architecture, it is passed through the first and second cache controllers 10 and 12.

As this request R4-1 is passed through the first cache controller 10, the first cache controller 10 detects that the processor 6 starts a write operation. In expectation of request for data, the first cache controller 10 starts prefetching data in a subsequent step 425. Consequently, a request R4-2 is sent from the first cache controller 10 back to the processor 6. At a step 440, the processor 6 receives the request R4-2 and starts reading of data from the buffer list. This data is then transferred to the second cache controller 12 by means of one or several requests R4-3, where it is buffered in the tag CAM 20.

At the same time, the input/output component 9 receives the first request R4-1 and, in step 430, detects that its buffer is empty. Consequently, it issues an identical request R4-2' for reading of data from the buffer list back to the processor 6, which, however, is intercepted by the second cache controller 12 in step 445. The second cache controller 12 intercepts the request R4-2 due to the fact that, in the meantime, it has received data sent with request R4-3 from the processor 6 at step 440 and immediately transmits this data to the input/output component 9 in step 445 using a request R4-3', which is identical or at least similar to the previously received request R4-3.

In a subsequent step 450, the input/output component 9 starts transmitting the received data to the hard disk drive as described in step 350 above. In a step 460, the buffer of the hard disk drive or SCSI controller is empty; consequently it requests further data from the cache second controller 12 using a request R4-4. Because the cache memory 13 associated with the input/output component 9 still contains some data to be transferred to the hard disk drive, some data is immediately returned using a further request R4-5 in step 462 for writing. At the same time, or upon detection that the data cached in the second cache memory 13 has reached a critical limit, in a step 464, further data is requested from the processor 6 by the second cache controller 12 using a request R4-6.

In a step 470, further data is read by the processor 6 from the main memory 5 and transferred back to the second cache controller 12 using a request R4-7, thus allowing an uninterrupted flow of data between the second cache memory 13 and the input/output component 9 connected to the hard disk drive. The process then repeats as described above, until all data has been written.

Optionally, the first cache controller 10 may perform a snooping operation in a step 480 to ensure that the data of the buffers stored in the main memory 5 has not been changed by the processor 6 in the meantime. This is particularly important in systems having multiple processors 6 operating on the same segment of main memory 5. In case a modification of the data in the main memory 5 is detected, an invalidation request R4-8 may be transmitted from the first cache controller 10 to the second cache controller 12, in order to prevent the second cache controller 12 from supplying stale data to the input/output component 9.

Similar consistency problem may arise when using the proposed cache arrangement in combination with particular complex input/output components. Thus, in a further embodiment, cache consistency may be enforced by detecting write requests of the processor 6 to a cached item as detailed below.

Consistency can either be enforced by including the first cache controller 10 into the cache coherency protocol, for example the so-called MESI (modified, exclusive, shared invalid) protocol, which is used among several processors 6. In this way, after prefetching an item from main memory 5, the first cache controller 10 can claim exclusive rights on the data item and any read or write accesses to the item from a processor 6 can be delayed and synchronized with the cache memories 11 and 13 and the input/output component 9. This method uses integration of the first cache controller 10 with the processor 9.

Alternatively, consistency can be provided on a per page basis by removing a page from the page table when ownership is transferred to the first cache controller such that a later access by the processor 6 causes a page fault.

In yet another embodiment, for example in driver environments as known from the operating system AIX, accesses to shared memory can be extended by control instructions for a cache. This extension can be done without changing the source code of the driver by known software methods, such as the modification of macros. These macros are frequently used to express the access to shared memory related to IO operations. In this way, accesses that potentially could violate consistency are extended by a check access with the first cache controller 10.

Figure 5:
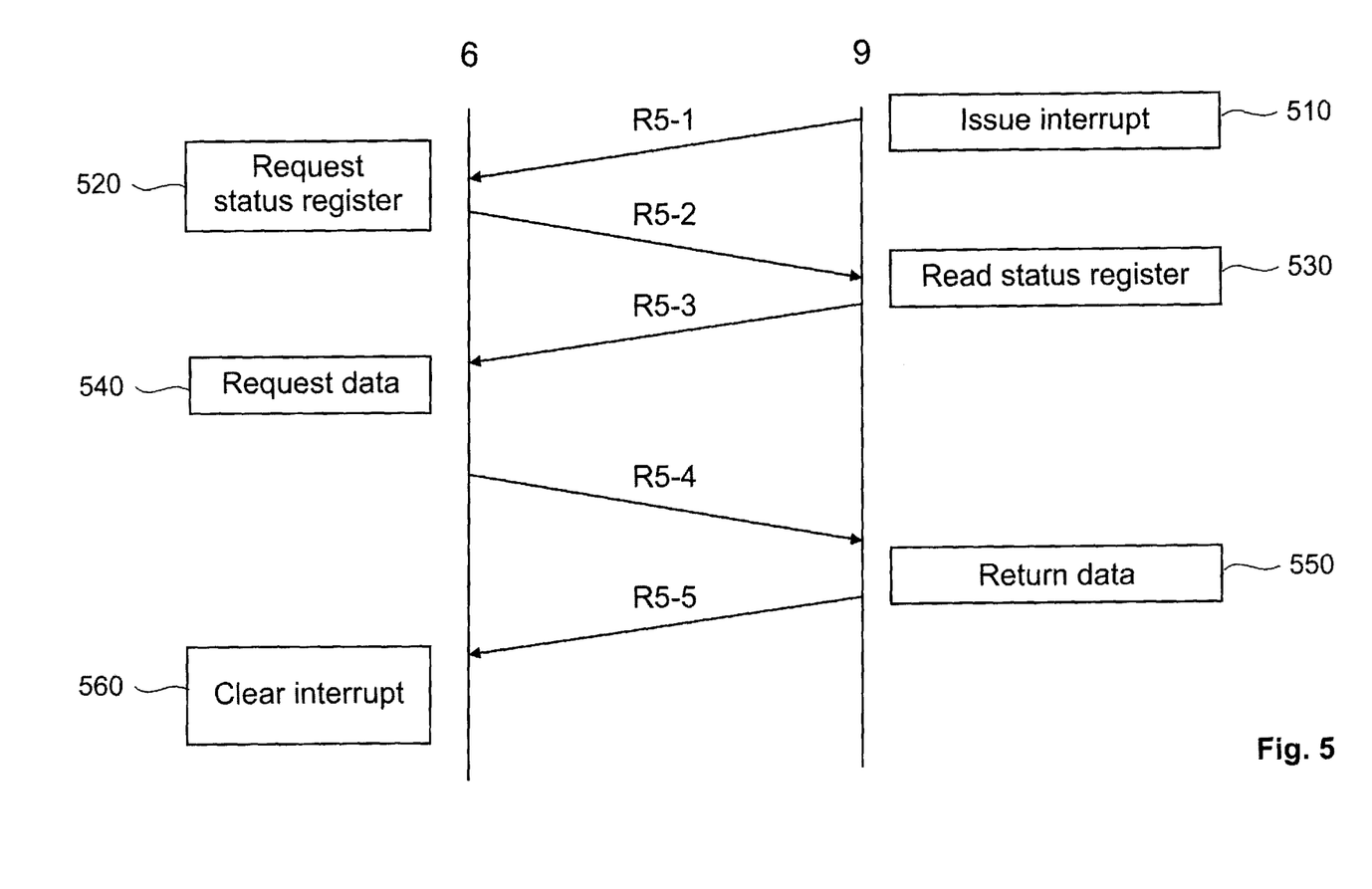
FIG. 5 shows an interaction diagram for a conventional second request.

FIG. 5 shows another interaction diagram for a second interaction pattern between a processor 6 or another component of the main unit 2 and an input/output component 9. In the scenario depicted in FIG. 5, the input/output component 9 may be a network card receiving a frame from an attached data network.

In a step 510, an event is detected by the input/output component. For example, a data frame addressed to the network card may be detected. Consequently, the input/output component 9 issues an interrupt using a request R5-1 to the processor 6.

In a step 520, an interrupt handler routine is started. A first action of the interrupt handler routine includes to read out a status register of the input/output component 9 in order to determine the type of event that has happened. For this purpose, a request R5-2 is issued to the input/output component 9.

Upon reception of a request R5-2, the input/output component 9 reads out the requested value of the status register in a step 530 and returns it in a response request R5-3 to the processor 6.

In a step 540, the response request R5-3 is processed by the interrupt handler routine, which may react to the read data by requesting data of the network frame received by the network card, for example. This is performed in step 540, in which a further request R5-4 is sent to the input/output component 9.

In a step 550, the input/output component 9 returns the further data requested by the processor 6 using a response request R5-5. In a step 560, the data received from the input/output component 9 is processed by the processor 6 and the interrupt handler routine terminates.

As can be seen from the interaction diagram depicted in FIG. 5, the interrupt handler routine performing in steps 520, 540 and 560 takes a very long time to complete, due to the latencies of exchanging requests over the expansion network 15. As interrupt handler routines are usually performed with a very high priority by a processor 6, this may result in a significant performance degradation for the computer system 1.

Figure 6:
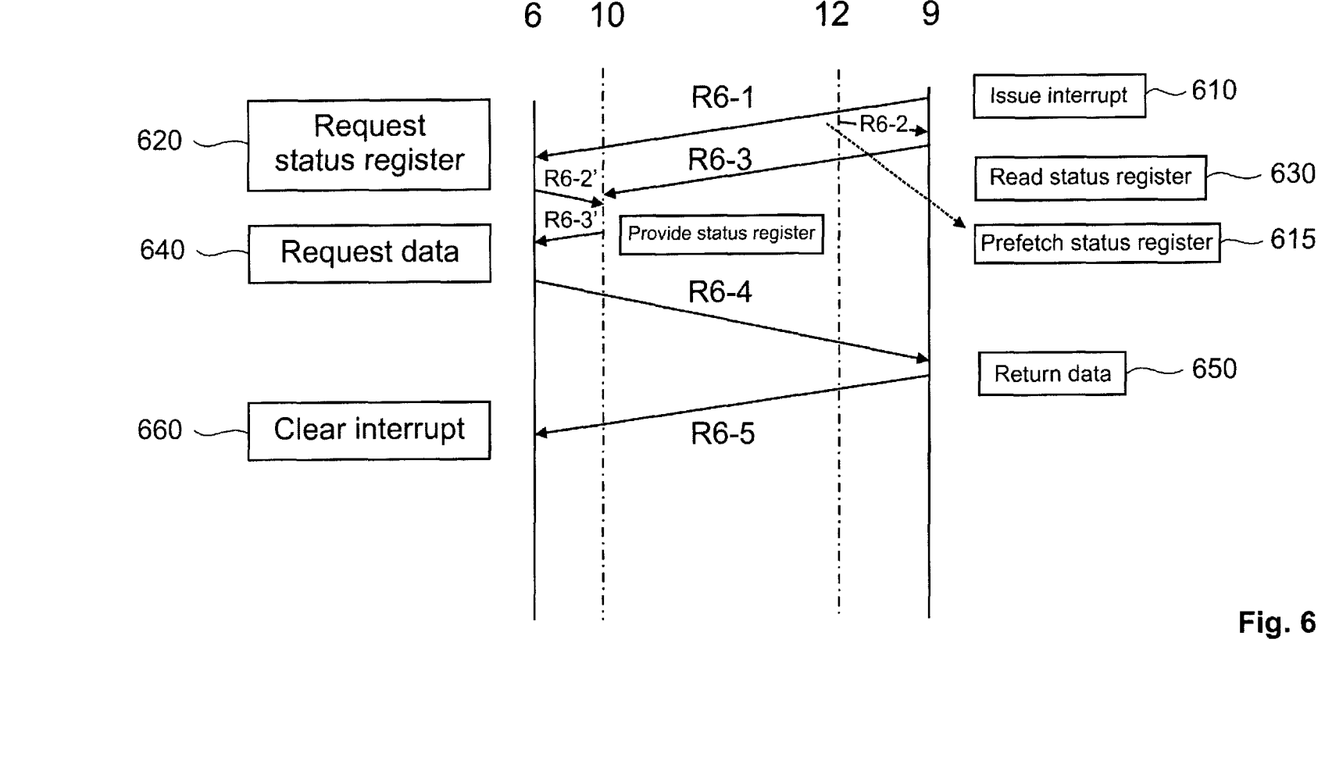
FIG. 6 shows an interaction diagram for the second request according to an embodiment of the present invention.

FIG. 6 shows an improved interaction diagram for the second interaction scenario.

In a step 610, an interrupt is issued to the processor 6 by the input/output component 9 because of the detection of a particular event using a request R6-1 as described above. This request R6-1 is monitored by the second cache controller 12 that, upon detection of the interrupt, recognizes that a request R6-2 requesting the data of a status register is likely to follow. Consequently, in a step 615, the request R6-2 is issued from the second cache controller 12 to the input/output component 9 and its result is transferred using a request R6-3 to the first cache controller 10.

At the same time, the request R6-1 is processed in a step 620 by the processor 6 and causes an interrupt handler routine to be started. In consequence, as before, an identical request R6-2' is issued by the processor 6 towards the input/output component 9 for reading the value of the status register. However, as this value has already been received by the first cache controller 10 in the meantime, the request R6-2' is intercepted in a step 635 and the value of the status register is transferred from the first cache controller 10 to the processor 6 for further processing using a request R6-3' generated by the first cache controller 10 or stored in the first cache memory 11.

In a step 640, the received value is processed by the interrupt handler routine as described above, resulting in a further request R6-4 to be issued to the input/output component 9 requesting further data. As, in the example given, the data requested by the further request cannot be predicted based solely on the interrupt issued by the network card in step 610, the data requested in step 640 is not cached by either the first or the second cache memory 11 or 13, respectively. Consequently, the request R6-4 is responded to by the input/output component 9 in steps 650 in a similar way as described for step 550 above.

In step 660, the processor 9 receives a request R6-5 received from the input/output component including the requested data and the interrupt handler routine terminates.

As can be seen from the interaction diagram presented in FIG. 6, the amount of time the interrupt handler routine uses for processing the interrupt issued by the input/output component 9 has been greatly reduced in comparison to the scenario depicted in FIG. 5 in the absence of the first and second cache controller 10 and 12, respectively.

Other interaction scenarios between core components of a main unit 2 and input/output components 9 of a computer system 1 exist, which may be either deterministic due to the protocol used in communication between the main unit 2 and the expansion unit 3, or, which may be learnt based on data stored in a history array 22 of either the first or the second cache memory 11 or 13, respectively.

As maintaining a separate driver code for systems which use the proposed invention is costly, in a further advantageous embodiment, an automatic configuration using self-learning strategies for the interface unit 14 or the input/output interface 7 may help to automatically discover rules regarding the communication specific to a particular input/output component 9.

So far the caches controllers 10 and 12 have been described assuming that they are configured specific to a connected input/output component 9. In particular, the prefetch trigger engine 17 and the cache clearing engine 16 are configured in a device specific way, e.g. including specific action on which interrupt causes which register to be cached, for which register writes additional memory reads are performed on the CPU-side and so forth. This is possible when the details of the input/output component 9 and the device drivers are known.

However, as detailed above, this is not always the case. Many computer systems 1 will operate using third-party operating systems and closed-source drivers. Also, details of high-end adapter cards may be confidential under NDA. To allow efficient use of the proposed caches also in these cases, in a further embodiment, the configuration of the cache controllers 10 and 12 can be determined by learning. This means that the system is run in a training session in which the cache controllers 10 and 12 do not cache, that is no items are stored in or prefetched into the cache memories 11 and 13.

Learning in principle has the notion of uncertainty. Only because during all transactions, i.e. sequence of two or more requests, seen during learning or operation so far showed a correlation between two request, e.g. an interrupt and a read, it is not guaranteed that there is such a correlation. Even more important, the absence of a correlation can not be deduced with absolute certainty. Some correlations might clear the cache memories 11 or 13 and, if such an association, for instance between a processor write and the validity of a cached input/output component register is missed, the resulting configuration might decrease the reliability of operation of the input/output component 9.

According to further embodiments, two learning modes may be distinguished. In passive learning the caches only observe the transactions between a processor 6, the main memory 5 and an input/output component 9. In active learning they deliberately delay some requests further to verify dependence between certain events. Some values will be cached, but the cached values are not delivered to input/output component 9 or processor 6. However, on subsequent read requests the caches compare their cached values with the ones observed from the subsequent read requests. Furthermore, memory locations and device registers are read intermediately to check whether the cached values should have been discarded or not. In this way, the assumptions about correlations or the absence of correlations can be confirmed in a more directed way than during passive learning.

For instance, if a set of writes from the input/output component 9 to the main memory 5, an interrupt followed by a processor read of a input/output component register is observed, the cache controllers 10 or 12 can delay the interrupt to see whether the processor read is a consequence of the interrupt or correlated with the previous memory writes.

In order to allow training of the cache controllers 10 and 12, training session should include use of all typical features of all used input/output component 9, if possible including device failures. Furthermore, the learning will be more effective if only one device and thus input/output component 9 is used at a time, at least for the cache arrangement used for training. If several devices are used at the same time during training, additional methods may be used to isolate the transactions for the device of interest. This can be done, for example, by intercepting registration calls of main memory used for device access and of device addresses. For instance, in Linux main memory allocation for use by an external device has a special flag.

Passive learning starts with read transactions and searches in the history of transactions backward to find the read address and length. Following a principle also known as "Occam's Razor", exact matches of the address in the payload of a previous write request or read request response with a specific address are treated as most likely correlation. If such a connection is found with a sufficient high frequency it can be used for configuring the prefetch trigger engine 17 for prefetching. If no such correlation is found it is assumed that the address used by the device is formed by combining two address parts, e.g. page or segment and offset. Furthermore, it can happen that the address directly or as a page+offset pair is found, but in write requests to a wider set of registers. In this case, regularity should be found to distinguish those registers that will trigger a prefetch from those which do not. In this context, the absence of a subsequent read request is no indication that a prefetch would have been wrong, but a write request with a payload which is not a valid shared in memory or respective a valid device address is.

The learning can be implemented in hardware or software in the cache controllers 10 or 12 or as software on the processor 6 or as a separate device which is connected to the expansion network 15 temporarily. If the configuration of the caches has been deduced solely from learning one can add a set of alarm triggers which watch for pattern which were not observed during learning.

In these, or in other circumstances, in particular if an error in the communication might have happened or is detected by either the core components of the main unit 2, one of the input/output components 9 or the interface arrangement 4, data stored in the first cache memory 11 and the second cache memory 13 should be deleted. For example, if the second cache controller 12 determines that an input/output component 9 does not follow rules stored in the trigger memory 19, either by default or predicted based on a learning phase, the second cache controller 12 might disable caching for this type of request or device.

In addition, the second cache controller may also hold the input/output component 9 in question and inform an administrator of the computer system 1 in order to check the proper operation of the input/output component 9. In this way, comparing predicted behavior of an input/output component 9 with its actual behavior may also be used in error detection. This is particularly useful in very large computer systems 1, in which tens or hundreds of input/output components 9 are connected to a main unit 2 by means of an expansion network 15.

Further responsibilities of the first and second cache controller 10 and 12, respectively, include purging data entries from the first and second cache memory 11 and 13, once they have become stale or they are unlikely to be used again.

Purging of cache entries may be performed, for example, if a timer associated with a particular entry of the data array 21 expires. For example, if a cache entry is not requested by a requestor within several hundred milliseconds, the cache entry may be deleted.

Alternatively, the cache entry may be deleted once it has been transmitted to the other end of the expansion network 15, i.e. from the first cache controller 10 to the second cache controller 12 or, in the opposite direction, from the cache controller 12 to the first cache controller 10 due to the occurrence of the predicted request. As in the input/output transmission scenarios depicted and addressed by the various embodiments, the repeated transmission of the same piece of data is unlikely, cache entries may be purged upon their first retrieval.

In addition, snooping processes performed by the first cache controller 10 and the second cache controller 12 may detect that data stored in the first cache memory 11 or the second cache memory 13 has become invalid, due to processing performed by a processor 6 or a device connected to an input/output component 9. In this case, data stored in the first cache memory 11 or second cache memory 13 should be purged, too.

As can be seen from the interaction diagrams presented in FIG. 4 and FIG. 6, the caches arrangements perform actions which are specific to the input output component 9, as further described below.

In a first situation, when the processor 6 writes into a specific register of an input/output component 9, the first cache controller 10 recognizes that the value written into this register will be interpreted as a pointer and therefore be used by the input/output component 9 for a subsequent memory read. This can be done on the base of the register address. Because some input/output component 9 use indirect addressing of registers, for example they use an address and a data register to access a large address space on the input/output component 9, the cache controller 10 might collect several requests and match on the combination of the requests.

The second cache controller 12 behaves in the first situation like a normal cache, that is, it detects the address from which the input/output component 9 wants to fetch data and provides this data.

In a second situation, the second cache controller 12 detects an interrupt issued by the input/output component 9. It recognizes the type of interrupt, for example Transmit Queue Empty, and reads the corresponding status register and transfers the status register contents and the status register address to the first cache controller 10 or the first cache memory 11.

In the second situation, the first cache controller behaves like a normal cache by matching on the read address, for example the status register value, and providing the cached value from its memory 11.

Both cache controllers 10 and 12 can receive requests from the respective other cache controller, i.e. the first cache controller 10 can receive requests from the second cache controller 12 to store a particular item and vice versa, the first cache controller 10 can send a request to the second cache controller 12 to store a data item in the second cache memory 13.

In an improved embodiment, both caches may be configured and checked for their recent activities in case of an error. Consequently, they also behave like input/output components 9 having their own address spaces. This address space can be used for the inter-cache controller requests.

According to yet another embodiment, in a very large computer system 1, there will be several first and second cache controllers 10 or 12 and/or cache memories 11 or 13. If strong redundancy is desired, each request, for example the read-out of a status register, can be duplicated and send to two redundant first or second cache controllers 10 or 12. This might be necessary if the read-out is destructive, i.e. if the original register value is lost after read out. For instance, some input/output component 9 clear flags that indicate the cause of an interrupt when the corresponding flag register is read.

What is claimed is:

1. A computer system comprising:
    a main unit having a main memory, at least one processor for processing data from said main memory and an input/output interface;
    an expansion unit comprising at least one connector for connecting an input/output component, wherein said expansion unit increases the number of extension modules to be added to the main unit; and
    an interface arrangement connecting said main unit and said expansion unit, said interface arrangement having at least one cache controller and at least one cache memory for storing data to be transmitted to or from at least one input/output component of said expansion unit, wherein the at least one cache controller is operable to monitor requests exchanged over said interface arrangement and to prefetch data in the at least one cache memory for requests predicted based on training information for the monitored requests and wherein the training information is derived from a learning mode configured to correlate requests based on event dependencies;
    wherein said interface arrangement has a first cache controller and a first cache memory arranged in proximity to said input/output interface, and a second cache controller and a second cache memory arranged in proximity to said expansion unit.

2. The computer system according to claim 1, wherein said cache controller is for use in an interface arrangement connecting said main unit and said expansion unit, comprising:
    said main unit having said main memory, said at least one processor and an input/output interface; and said expansion unit having at least one connector for connecting said input/output component; said cache controller being functionally coupled to said cache memory and operable to monitor requests exchanged over said interface arrangement and to prefetch data in said at least one cache memory for requests predicted based on the monitored requests.

3. The computer system according to claim 1, wherein at least two cache memories have a tagged content addressable memory and addresses associated with at least one input/output component are used for tagging.

4. The computer system according to claim 1, wherein said first cache controller and said second cache controller provide means for inter-cache controller communication.

5. A method of caching and processing input/output requests in a computer system, said computer system having a main unit, an expansion unit and an interface arrangement connecting said main unit and said expansion unit,
    wherein said main unit further having a main memory, at least one processor and an input/output interface,
    said expansion unit having at least one connector for connecting an input/output component, wherein said expansion unit increases the number of extension modules to be added to the main unit,
    said interface arrangement having said at least one cache controller and said at least one cache memory, the method comprising:
    providing a first request associated with said input/output component of said expansion unit by a requestor to a requestee;
    receiving said first request by a first cache controller;
    predicting, based on said first request and said associated input/output component and based on training information derived from a learning mode configured to correlate requests based on event dependencies, a second request likely to succeed said first request; and
    prefetching data associated with said second request and storing the data in a cache memory of a second cache controller;
    receiving said second request by a second cache controller;
    determining whether said second request can be served using data stored in said cache memory;
    providing a third request based on said data stored if said second request can be served using data stored in said cache memory; and
    forwarding said second request otherwise, if said second request cannot be served using data stored in said cache memory.

6. The method according to claim 5, wherein at least one cache controller is operable in the learning mode and in a normal operation mode, further comprising the following steps performed in the learning mode:
    forwarding said first request to said requestee;
    receiving said second request from said requestee;
    forwarding said second request to said requestor; and
    correlating said first request and said second request to derive a property of the associated input/output component.

7. The method according to claim 6, further comprising:
    receiving a third request associated with said input/output component of said expansion unit by said requestor to said requestee;
    wherein in the step of correlating, said third request is taken into account to derive the property of said associated input/output component.

8. The method according to claim 5, wherein said first or said second request comprises at least one of the following:
    an address associated with said input/output component;
    an interrupt associated with said input/output component; and
    a data value associated with a specific request type.

9. The method according to the claim 5, further comprising:

clearing the data from said at least one cache memory by said at least one cache controller, in at least one of the following cases:
a timer associated with the data expires;
the data is used in a third request sent to the requestor; and
a further request is received by said cache controller, the further request invalidating the data.

10. A storage medium tangibly embodying a program of machine-readable instructions executable by a digital processing apparatus to carry out a method of caching and processing input/output requests in a computer system, said system having a main unit, an expansion unit and an interface arrangement connecting said main unit and said expansion unit,
wherein said main unit further having a main memory, at least one processor and an input/output interface,
said expansion unit having at least one connector for connecting an input/output component, wherein said expansion unit increases the number of extension modules to be added to the main unit,
said interface arrangement having said at least one cache controller and said at least one cache memory, the method comprising the steps of:
providing a first request associated with an input/output component of an expansion unit by a requestor to a requestee;
receiving said first request by a first cache controller;
predicting, based on said first request and said associated input/output component and based on training information derived from a learning mode configured to correlate requests based on event dependencies, a second request likely to succeed said first request;
prefetching data associated with said second request and storing the data in a cache memory of a second cache controller;
receiving said second request by a second cache controller;
determining whether said second request can be served using data stored in said cache memory;
providing a third request based on said data stored if said second request can be served using data stored in said cache memory; and
forwarding said second request otherwise, if said second request cannot be served using data stored in said cache memory.

11. The storage medium of claim 10, wherein said program further includes the steps of:
forwarding said first request to the requestee;
receiving a second request from the requestee;
forwarding said second request to the requestor; and
correlating said first request and said second request to derive a property of the associated input/output component.

12. The storage medium of claim 11, wherein said program further includes the step of:
receiving a third request associated with said input/output component of said expansion unit by the requestor to the requestee;
wherein in the step of correlating, said third request is taken into account to derive the property of said associated input/output component.

13. The storage medium of claim 10 wherein said first or said second request comprises at least one of the following:
an address associated with said input/output component;
an interrupt associated with said input/output component; and
a data value associated with a specific request type.

14. The storage medium of claim 10, wherein said program further includes the step of:
clearing the data from said at least one cache memory by said at least one cache controller, in at least one of:
a timer associated with the data expires;
the data is used in a third request sent to the requestor; and
a further request is received by said cache controller, the further request invalidating the data.

* * * * *